(12) United States Patent
Youn et al.

(10) Patent No.: US 7,502,319 B2
(45) Date of Patent: Mar. 10, 2009

(54) ETHERNET PACKET TRANSMISSION APPARATUS AND METHOD

(75) Inventors: Ji Wook Youn, Daejeon (KR); Hyun Yong Hwang, Daejeon (KR); Jong Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 571 days.

(21) Appl. No.: 11/197,030

(22) Filed: Aug. 4, 2005

(65) Prior Publication Data

US 2006/0126511 A1    Jun. 15, 2006

(30) Foreign Application Priority Data

Dec. 10, 2004   (KR) ................ 10-2004-0104346
May 6, 2005    (KR) ................ 10-2005-0037957

(51) Int. Cl.
*G01R 31/08* (2006.01)
*H04L 12/28* (2006.01)

(52) U.S. Cl. ................... 370/230; 370/395.42
(58) Field of Classification Search ........... 370/235, 370/252, 395.21, 230, 231, 395.41, 395.42
See application file for complete search history.

(56) References Cited

U.S. PATENT DOCUMENTS

| | | | |
|---|---|---|---|
| 6,014,708 A | 1/2000 | Klish | |
| 6,496,519 B1 | 12/2002 | Russell et al. | |
| 6,754,179 B1* | 6/2004 | Lin | 370/235 |
| 7,006,440 B2* | 2/2006 | Agrawal et al. | 370/235 |
| 2001/0043603 A1 | 11/2001 | Yu | |
| 2002/0136163 A1* | 9/2002 | Kawakami et al. | 370/229 |
| 2003/0147347 A1* | 8/2003 | Chen et al. | 370/229 |
| 2003/0185249 A1* | 10/2003 | Davies et al. | 370/535 |
| 2004/0179476 A1* | 9/2004 | Kim et al. | 370/230 |
| 2005/0259575 A1* | 11/2005 | Krishnamurthi et al. | 370/229 |

(Continued)

FOREIGN PATENT DOCUMENTS

JP        2001-86154        3/2001

(Continued)

OTHER PUBLICATIONS

'Encapsulation and Rate Adaptation for Ethernet Over SDH' Li et al., 2002 IEEE, pp. 1301-1305.

(Continued)

*Primary Examiner*—Kwang B Yao
*Assistant Examiner*—Candal Elpenord
(74) *Attorney, Agent, or Firm*—Ladas & Parry LLP

(57) ABSTRACT

The Ethernet packet transmission apparatus includes: a packet transceiving unit for transceiving an Ethernet packet through a plurality of Ethernet ports; a MAC header processing unit for receiving the Ethernet packet and reading header information; a packet processing unit for receiving the Ethernet packet, classifying the received Ethernet packet on a service or destination basis, assigning a priority label to the classified Ethernet packet on a packet-by-packet basis, and outputting memory state information on the corresponding port; a congestion controlling unit for controlling a position in an output sequence of the Ethernet packet; and a signal processing unit for receiving and comparing the port state information and the memory state information and outputting either a memory control signal or a congestion control signal to control the packet processing unit and the congestion controlling unit.

11 Claims, 3 Drawing Sheets

U.S. PATENT DOCUMENTS

2006/0291458 A1 * 12/2006 Liu et al. .................... 370/375

FOREIGN PATENT DOCUMENTS

| JP | 2001-186173 | 7/2001 |
| JP | 2002-374295 | 12/2002 |
| KR | 2003-0017704 | 3/2003 |
| KR | 20030051524 | 6/2003 |
| KR | 10-20040032558 | 4/2004 |
| KR | 10-20040047088 | 6/2004 |

OTHER PUBLICATIONS

'Data Transport Applications Using GFP' Scholten et al., IEEE Communications Magazine, May 2002, pp. 96-103.

* cited by examiner

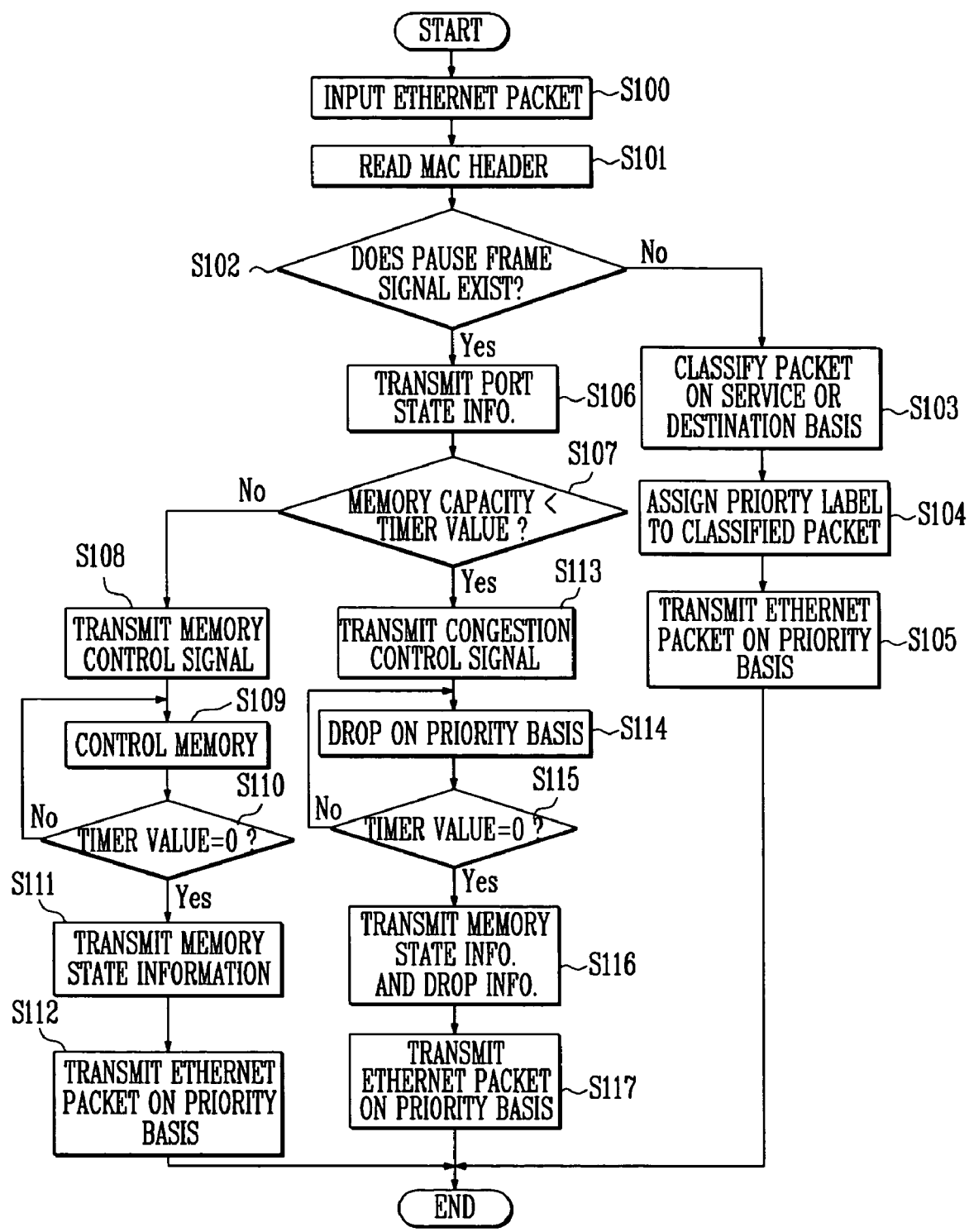

ETHERNET PACKET TRANSMISSION APPARATUS AND METHOD

CROSS-REFERENCE TO RELATED APPLICATION

This application claims the priority of Korean Patent Application No. 2004-104346, filed Dec. 10, 2004 and Korean Patent Application No. 2005-37957, filed May 6, 2005, the disclosure of which is incorporated herein in its entirety by reference.

BACKGROUND

1. Field of the Invention

The present invention relates to an Ethernet packet transmission apparatus and method, and more particularly, to an Ethernet packet transmission apparatus and method for effectively guaranteeing differentiated transmission performance on a packet-by-packet basis by classifying an Ethernet packet input to a system on a service or destination basis, assigning a priority label to the packets classified on a packet-by-packet basis, and respectively applying different drop rates to the packets.

2. Discussion of Related Art

In general, a conventional Ethernet packet transmission apparatus manages an Ethernet packet only on a port or destination basis. Accordingly, when a system is congested, entire groups of Ethernet packets classified on the port basis are dropped in an arbitrary manner, not on a packet-by-packet basis. Therefore, the conventional Ethernet packet transmission apparatus cannot guarantee transmission performance on a packet-by-packet basis, and accordingly, cannot provide differentiated service on a packet-by-packet basis.

However, the Ethernet packet transmission apparatus is being currently changed in structure so as to satisfy consumers' various requirements. Accordingly, differentiated service on a packet-by-packet basis should be secured so as to satisfy the consumers' various requirements and more efficiently utilize limited system resources.

In a conventional Ethernet packet transmission method for guaranteeing transmission performance, when the system fails or is congested, a pause frame signal is inserted into a Media Access Control (MAC) header, and the Ethernet packet is controlled and communicated using the inserted pause frame signal.

In the conventional Ethernet packet transmission method, when the pause frame signal is input from a neighboring node, packet transmission to a corresponding port is paused for a predetermined time. Accordingly, when packet transmission is paused for a long time, a phenomenon in which the Ethernet packet is dropped in an arbitrary manner at the port for receiving the pause frame signal occurs.

Accordingly, in a conventional flow control method using pause frame signal to control and communicate an Ethernet packet, when a specific node is congested, the Ethernet packet cannot be dropped in a selective manner. Therefore, the conventional flow control method has the disadvantage of being unable to guarantee transmission performance and provide differentiated service on a packet-by-packet basis.

Further, the conventional flow control method has another disadvantage in that even in an entire network for Ethernet packet transmission, it is difficult to effectively manage the entire network because each node has continuous congestion influence on neighboring nodes.

SUMMARY OF THE INVENTION

The present invention is directed to an Ethernet packet transmission apparatus and method in which an Ethernet packet input to a system is classified on a service or destination basis, priority labels are assigned to the classified packets on a packet-by-packet basis, and different drop rates are respectively applied to the packets having the assigned priority labels so that when a pause frame signal is input from a neighboring node, an Ethernet packet having a low priority label within the system can be dropped on a packet-by-packet basis, thereby effectively guaranteeing differentiated transmission performance on a packet-by-packet basis.

The present invention is also directed to an Ethernet packet transmission apparatus and method in which when packet transmission is paused for a long time, input of a specific packet (a packet having a low priority label) through a corresponding port is cut off, thereby preventing influence on other Ethernet packets having high priority labels, further guaranteeing transmission performance on a packet-by-packet basis, and accordingly providing differentiated service.

One aspect of the present invention provides an Ethernet packet transmission apparatus including: a packet transceiving unit for transceiving an Ethernet packet through a plurality of Ethernet ports; a MAC header processing unit for receiving the Ethernet packet from the packet transceiving unit and reading header information from the received Ethernet packet to detect a predetermined pause frame signal and output port state information on a corresponding port; a packet processing unit for receiving the Ethernet packet from the MAC header processing unit, classifying the received Ethernet packet on a service or destination basis depending on a predetermined standard, assigning a priority label to the classified Ethernet packet on a packet-by-packet basis and outputting memory state information on the corresponding port; a congestion controlling unit for controlling a position in an output sequence of the Ethernet packet depending on the assigned priority label; and a signal processing unit for receiving and comparing the port state information and the memory state information with each other and outputting either a memory control signal or a congestion control signal depending on the comparison result to control the packet processing unit and the congestion controlling unit.

It is desirable that when the packet processing unit receives the memory control signal from the signal processing unit, it stores the Ethernet packet in a corresponding memory.

It is desirable that when the congestion controlling unit receives the congestion control signal from the signal processing unit, it drops the Ethernet packet on a priority basis and transmits the memory state information on the corresponding port and information on the dropped packet to the signal processing unit.

It is desirable that the signal processing unit provides a predetermined standard to the packet processing unit and stores and manages a process result of the packet processing unit and the congestion controlling unit.

Another aspect of the present invention provides an Ethernet packet transmission method including the steps of: (a) receiving an Ethernet packet through a plurality of Ethernet ports and reading header information from the Ethernet packet to detect a pause frame signal; (b) when the pause frame signal is not detected, classifying the Ethernet packet on a service or destination basis depending on a predetermined standard, assigning a priority label to the classified Ethernet packet on a packet-by-packet basis, and outputting memory state information on a corresponding port; (c) when the pause frame signal is detected, outputting port state information on the corresponding port, comparing the port state information with the memory state information, and outputting a memory control signal or a congestion control signal depending on the comparison result; and (d) when the memory control signal is received, controlling a corresponding memory, and when the congestion control signal is received, dropping the Ethernet packet on a priority basis.

It is desirable that step (c) includes the steps of: comparing an available memory capacity of the memory state information with a timer value of the port state information; and when it is determined from the comparison result that the memory capacity is larger than the timer value, outputting the memory control signal.

It is desirable that step (c) includes the steps of: comparing an available memory capacity of the memory state information with a timer value of the port state information; and when it is determined from the comparison result that the memory capacity is smaller than the timer value, outputting the congestion control signal.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 5 is a flowchart illustrating an Ethernet packet transmission method according to an embodiment of the present invention.

DETAILED DESCRIPTION OF PREFERRED EMBODIMENTS

Hereinafter, exemplary embodiments of the present invention will be described in detail. However, the present invention is not limited to the embodiments disclosed below and can be implemented in various modified forms. The exemplary embodiments are provided so that this disclosure is complete and capable of fully conveying the concept of the present invention to those of ordinary skill in the art.

Figure 1:
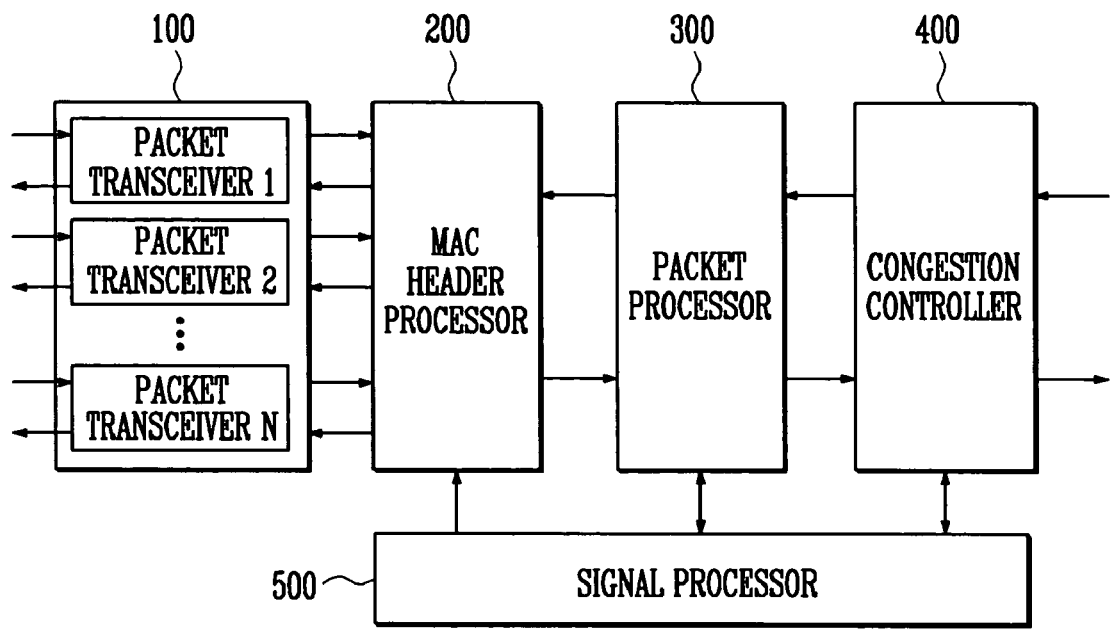
FIG. 1 illustrates the overall construction of an Ethernet packet transmission apparatus according to an embodiment of the present invention.

FIG. 1 illustrates the overall construction of an Ethernet packet transmission apparatus according to an embodiment of the present invention.

Referring to FIG. 1, the inventive Ethernet packet transmission apparatus includes a packet transceiver 100, a Media Access Control (MAC) header processor 200, a packet processor 300, a congestion controller 400, and a signal processor 500.

The packet transceiver 100 transceives an Ethernet packet through a plurality of Ethernet ports.

The MAC header processor 200 receives the Ethernet packet from the packet transceiver 100 and reads header information from the received Ethernet packet, thereby detecting a predetermined pause frame signal from the read header information. After that, the MAC header processor 200 outputs port state information on a corresponding port to the signal processor 500.

The packet processor 300 receives the Ethernet packet from the MAC header processor 200 and classifies the received Ethernet packet on a service or destination basis according to a predetermined standard of the signal processor 500. After that, the packet processor 300 assigns a priority label on a packet-by-packet basis, and outputs memory state information on a corresponding port to the signal processor 500.

When the packet processor 300 receives a memory control signal from the signal processor 500, it can control and store the Ethernet packet in a corresponding memory.

The congestion controller 400 controls a position in an output sequence of the Ethernet packet based on the priority label, which is assigned by the packet processor 300.

In other words, the congestion controller 400 determines the output sequence of the Ethernet packet based on the priority label, which is assigned in the packet processor 300, and inserts an inner label used for performing a switching operation within the system into the Ethernet packet.

When the congestion controller 400 receives a congestion control signal from the signal processor 500, it can drop the Ethernet packet on a priority basis and then transmit the memory state information on the corresponding port and information on the dropped packet to the signal processor 500.

After the signal processor 500 receives and compares the port state information and the memory state information with each other, it outputs the memory control signal or the congestion control signal to the packet processor 300 or the congestion controller 400 depending on the comparison result, and controls the packet processor 300 or the congestion controller 400.

In other words, when the signal processor 500 compares the port state information with the memory state information and determines that there is packet storage space in a memory, it transmits the memory control signal to the packet processor 300.

When the signal processor 500 compares the port state information with the memory state information and determines that there is no packet storage space in the memory, it transmits the congestion control signal to the congestion controller 400.

The signal processor 500 provides a standard for processing the Ethernet packet on the priority basis and can control the packet processor 300 and the congestion controller 400 to store and manage a process result of the packet processor 300 and the congestion controller 400.

Figure 2:
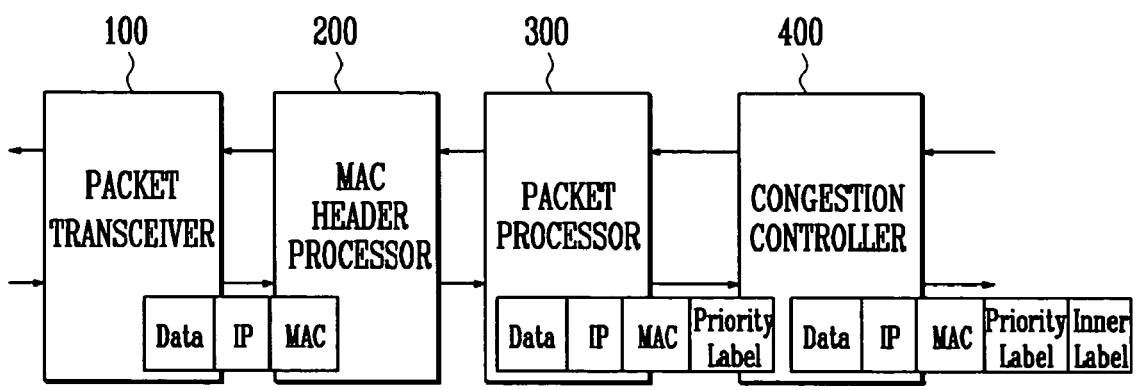
FIG. 2 illustrates packet flow for guaranteeing transmission performance of an Ethernet packet transmission apparatus according to an embodiment of the present invention.

FIG. 2 illustrates packet flow for guaranteeing transmission performance of the Ethernet packet transmission apparatus according to an embodiment of the present invention.

Referring to FIG. 2, after the packet transceiver 100 converts the received Ethernet packet into an electrical signals, it transmits the electrically converted Ethernet packet to the MAC header processor 200.

The MAC header processor 200 reads MAC header information from the converted Ethernet packet, detects a predetermined pause frame signal from the read MAC header information, and transmits the detected pause frame signal to the signal processor 500 (FIG. 1).

The packet processor 300 receives and separates the Ethernet packet on the service or destination basis, assigns the priority label to the separated Ethernet packet according to the standard of the signal processor 500 (FIG. 1), and transmits the Ethernet packet having the assigned priority label to the congestion controller 400.

The congestion controller 400 determines the packet's position in the output sequence based on the assigned priority label, and inserts the inner label, which is used for performing the switching operation within the system, into the Ethernet packet.

Figure 3:
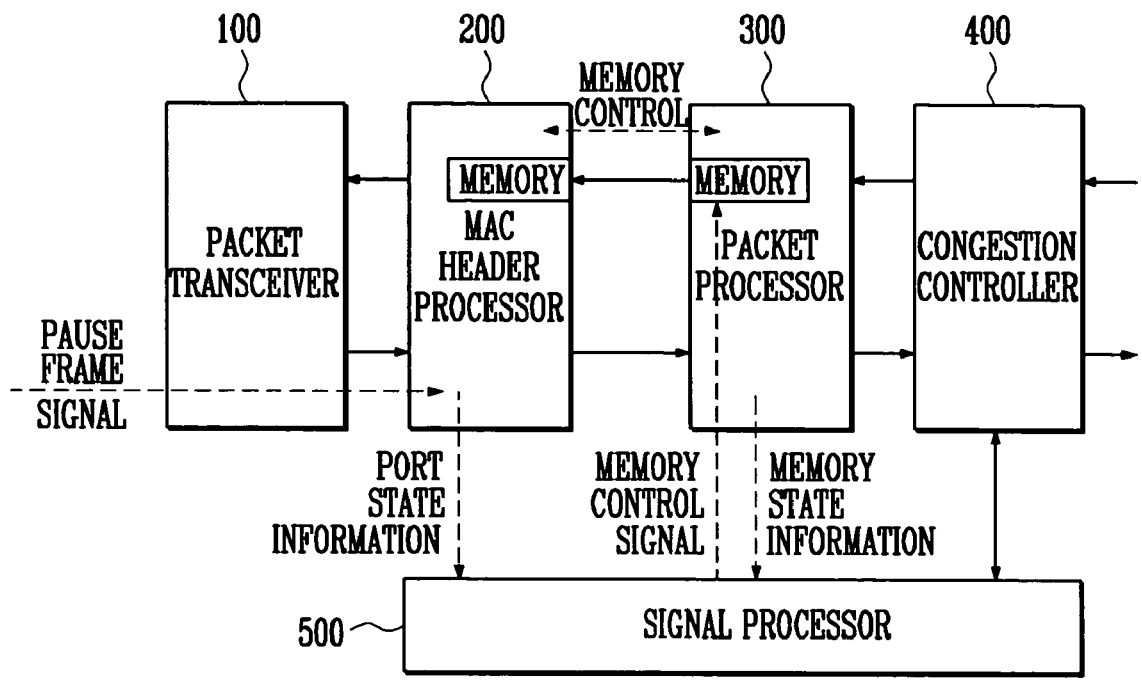
FIG. 3 illustrates signal flow for guaranteeing differentiated transmission performance on a packet-by-packet basis when a pause frame signal is input from a neighboring node in an Ethernet packet transmission apparatus according to an embodiment of the present invention.

FIG. 3 illustrates signal flow for guaranteeing differentiated transmission performance on a packet-by-packet basis when the pause frame signal is input from a neighboring node in the Ethernet packet transmission apparatus according to an embodiment of the present invention.

Referring to FIG. 3, in the inventive Ethernet packet transmission apparatus, when the pause frame signal is input from the neighboring node to the MAC header processor 200 through the packet transceiver 100, the MAC header processor 200 detects the pause frame signal and transmits the port state information on the corresponding port (information on the port for inputting the pause frame signal and a timer value representing a transmission pause time) to the signal processor 500.

The signal processor 500 receives and compares the memory state information on the corresponding port (an available memory capacity for the corresponding port) and the timer value of the port state information with each other. When it is determined from the comparison result that the available memory capacity is larger than the timer value, i.e., that there is packet storage space in the memory for a corresponding time, the signal processor 500 transmits the memory control signal to the packet processor 300 and controls the corresponding memory.

Figure 4:
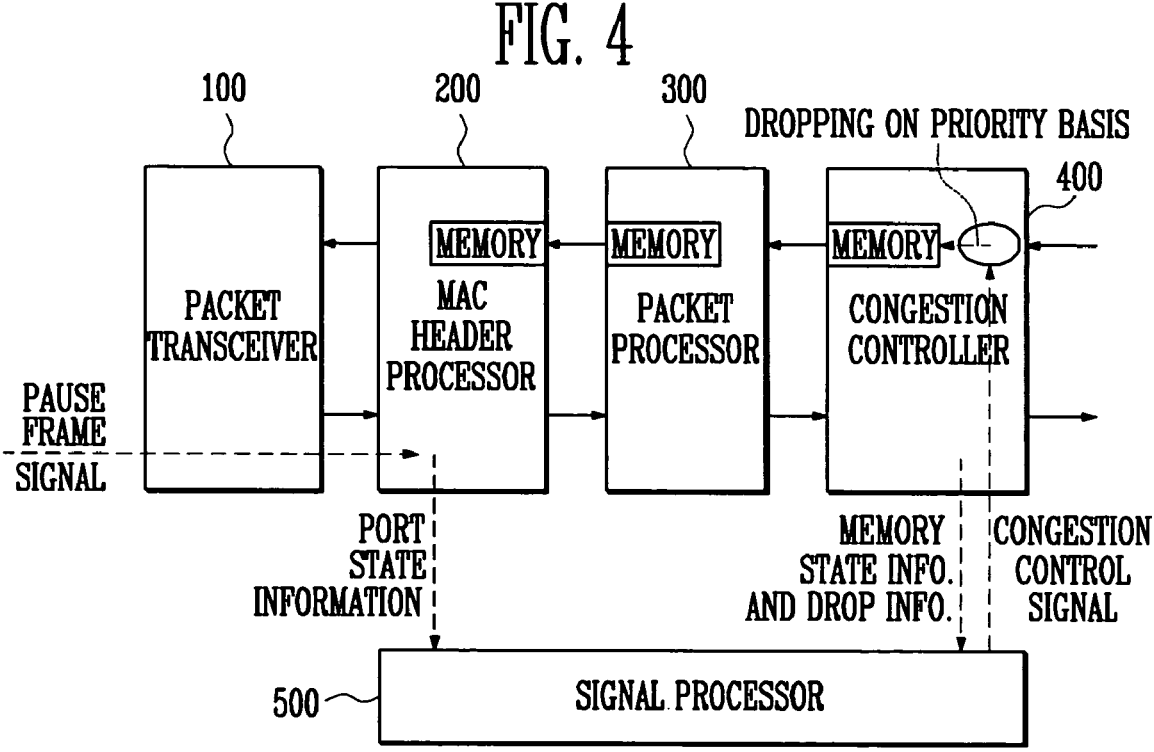
FIG. 4 illustrates signal flow for guaranteeing differentiated transmission performance on a packet-by-packet basis when a pause frame signal is input from a neighboring node in an Ethernet packet transmission apparatus according to another embodiment of the present invention.

FIG. 4 illustrates signal flow for guaranteeing differentiated transmission performance on a packet-by-packet basis when a pause frame signal is input from a neighboring node in an Ethernet packet transmission apparatus according to another embodiment of the present invention.

Referring to FIG. 4, in the inventive Ethernet packet transmission apparatus, when the pause frame signal is input from the neighboring node to the MAC header processor 200 through the packet transceiver 100, the MAC header processor 200 detects the pause frame signal and transmits the port state information on the corresponding port (information on the port for inputting the pause frame signal and a timer value representing a transmission pause time) to the signal processor 500.

The signal processor 500 receives and compares the memory state information on the corresponding port (available memory capacity for the corresponding port) and the timer value of the port state information with each other. When it is determined from the comparison result that the available memory capacity is smaller than the timer value, i.e., that there is no packet storage space in the memory for a corresponding time, the signal processor 500 transmits the congestion control signal to the congestion controller 400.

When the congestion controller 400 receives the congestion control signal from the signal processor 500, it drops the packets output to the corresponding port starting with the lowest priority label and transmits the memory state information on the corresponding port and the information on the dropped packets to the signal processor 500.

FIG. 5 is a flowchart illustrating an Ethernet packet transmission method according to an embodiment of the present invention.

Referring to FIG. 5, an Ethernet packet is received through a plurality of Ethernet ports, electrically converted in the packet transceiver 100, and then transmitted to the MAC header processor 200 (Step 100).

In the MAC header processor 200, the Ethernet packet is received from the packet transceiver 100 and the MAC header information is read from the received Ethernet packet (Step 101). Next, it is attempted to detect the pause frame signal from the read MAC header information to determine whether or not the pause frame signal is present (Step 102).

When it is determined in Step 102 that the pause frame signal is not present, the Ethernet packet is transmitted from the MAC header processor 200 to the packet processor 300. In the packet processor 300, the received Ethernet packet is classified on the service or destination basis defined in the signal processor 500 (Step 103). After that, a priority label is assigned to the classified Ethernet packet which is then transmitted to the congestion controller 400 (Step 104).

After that, in the congestion controller 400, the packet's position in the output sequence is determined by the assigned priority label, and the inner label used for performing the switching operation within the system is inserted into the Ethernet packet (Step 105).

The assigned priority label is used for the purpose of dropping the Ethernet packet when the system becomes congested or receives the pause frame signal from a neighboring node.

If it is determined in Step 102 that the pause frame signal is present, the port state information on the corresponding port is transmitted from the MAC header processor 200 to the signal processor 500 (Step 106).

After that, in the signal processor 500, it is determined whether or not the memory state information (the available memory capacity for the corresponding port) is smaller than the timer value of the port state information (Step 107).

If it is determined in Step 107 that the available memory capacity is larger than the timer value, that is, that there is packet storage space in the memory for a corresponding time, the memory control signal is transmitted from the signal processor 500 to the packet processor 300 (Step 108).

Subsequently, in the packet processor 300, a corresponding memory is controlled in response to the received memory control signal (Step 109) until the timer value equals "0" (Step 110). Next, the memory state information on the corresponding port is transmitted from the packet processor 300 to the signal processor 500 (Step 111). After that, the Ethernet packet is transmitted to the corresponding port (Step 112). Here, the Ethernet packet is not directly transmitted to the corresponding port but rather is stored in the memory of the corresponding port.

If it is determined in Step 107 that the available memory capacity is smaller than the timer value of the port state information, that is, that there is no packet storage space in the memory for the corresponding time, the congestion control signal is transmitted from the signal processor 500 to the congestion controller 400 (Step 113).

Next, when the congestion controller 400 receives the congestion control signal from the signal processor 500, Ethernet packets output to the corresponding port are dropped in order of lowest priority label first (Step 114) until the timer value equals "0" (Step 115). After that, the memory state information on the corresponding port and the information on the dropped packets are transmitted to the signal processor 500 (Step 116). Subsequently, the Ethernet packet is transmitted on the priority basis (Step 117).

In the present invention, when the pause frame signal is input from a neighboring node, the available memory capacity for the corresponding port is compared with the timer value of a pause frame signal and then the memory is controlled in response to the comparison result.

Further, in the present invention, when the available memory capacity for the corresponding port is insufficient, only packets having the low priority label are dropped, in a selective not arbitrary manner according to priority label assigned on the service or destination basis, thereby guaranteeing differentiated performance on a packet-by-packet basis.

As described above, in the Ethernet packet transmission apparatus and method, since a packet is distinguished on the service or destination basis and is assigned the priority label on a packet-by-packet basis, transmission performance is further guaranteed, differentiated service on a packet-by-packet basis is provided, and various service requirements can be satisfied. Further, the present invention has an advantage of being capable of maximizing transmission performance and efficiency.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An Ethernet packet transmission apparatus comprising:
   a packet transceiving unit for transceiving an Ethernet packet through a plurality of Ethernet ports;
   a MAC header processing unit for receiving the Ethernet packet from the packet transceiving unit and reading header information from the received Ethernet packet to detect a predetermined pause frame signal and output port state information on a corresponding port, said port state information including a timer value representing a transmission pause time on the corresponding port;
   a packet processing unit for receiving the Ethernet packet from the MAC header processing unit, classifying the received Ethernet packet on a service or destination basis depending on a predetermined standard, assigning a priority label to the classified Ethernet packet on a packet-by-packet basis, and outputting memory state information on the corresponding port, said memory state information including an available memory capacity for the corresponding port;
   a congestion controlling unit for controlling a position in an output sequence of the Ethernet packet depending on the assigned priority label; and
   a signal processing unit for receiving and comparing the port state information and the memory state information with each other, and outputting either a memory control signal or a congestion control signal depending on the comparison result to control the packet processing unit and the congestion controlling unit,
   wherein, if the pause frame signal is detected, the port state information including the timer value on the corresponding port and memory state information including the available memory capacity on the corresponding port are sent to the signal processor to control the packet processing unit and the congestion controlling unit before applying drop rates to the Ethernet packets.

2. The apparatus according to claim 1, wherein when the packet processing unit receives the memory control signal from the signal processing unit, the packet processing unit stores the Ethernet packet in a corresponding memory and transmit the memory state information to the signal processing unit.

3. The apparatus according to claim 1, wherein when the congestion controlling unit receives the congestion control signal from the signal processing unit, the congestion controlling unit drops the Ethernet packet on a priority basis and transmits the memory state information on the corresponding port and information on the dropped packet to the signal processing unit.

4. The apparatus according to claim 1, wherein the congestion controlling unit determines a position in an output sequence of the Ethernet packet depending on the assigned priority label, and inserts an inner label used for performing a switching operation within a system into the Ethernet packet.

5. The apparatus according to claim 1, wherein the signal processing unit provides a predetermined standard to the packet processing unit and stores and manages a process result of the packet processing unit and the congestion controlling unit.

6. The apparatus according to claim 1, wherein when the signal processing unit compares the port state information with the memory state information and determines from the comparison result that there is packet storage space in a memory, signal processing unit transmits the memory control signal to the packet processing unit.

7. The apparatus according to claim 1, wherein when the signal processing unit compares the port state information with the memory state information and determines from the comparison result that there is no packet storage space in the memory, the signal processing unit transmits the congestion control signal to the congestion controlling unit.

8. An Ethernet packet transmission method, comprising the steps of:
   receiving an Ethernet packet through a plurality of Ethernet ports and reading header information from the Ethernet packet to detect a pause frame signal;
   when the pause frame signal is not detected, classifying the Ethernet packet on a service or destination basis depending on a predetermined standard, assigning a priority label to the classified Ethernet packet on a packet-by-packet basis, and outputting memory state information on a corresponding port, said memory state information including an available memory capacity for the corresponding port;
   when the pause frame signal is detected, outputting port state information on the corresponding port, said Port state information including a timer value representing a transmission pause time on the corresponding port;
   comparing the timer value in the port state information with the available memory capacity in the memory state information, and outputting a memory control signal when the available memory capacity is larger than the timer value; and outputting a congestion control signal when the available memory capacity is smaller than the timer value; and
   when the memory control signal is received, controlling a corresponding memory, and when the congestion control signal is received, dropping the Ethernet packet on a priority basis,
   wherein, if the pause frame signal is detected, the port state information including the timer value representing the transmission pause time on the corresponding port and memory state information including the available memory capacity for the corresponding port are sent to a signal processor for outputting the memory control signal and the congestion control signal before applying drop rates to the Ethernet packets.

9. The method according to claim 8, wherein when the pause frame signal is not detected, classifying the Ethernet packet on a service or destination basis depending on a predetermined standard, assigning a priority label to the classified Ethernet packet on a packet-by-packet basis, and outputting memory state information on a corresponding port further comprises:

determining the output sequence of the Ethernet packet depending on the assigned priority label;

inserting an inner label used for performing a switching operation within a system into the Ethernet packet; and outputting a corresponding Ethernet packet.

10. The method according to claim 8, wherein when the memory control signal is received, controlling a corresponding memory, and when the congestion control signal is received, dropping the Ethernet packet on a priority basis further comprises:

storing the Ethernet packet in a corresponding memory until the port state information has a timer value of zero in response to the memory control signal.

11. The method according to claim 8, wherein when the memory control signal is received, controlling the corresponding memory, and when the congestion control signal is received, dropping the Ethernet packet on the priority basis further comprises:

dropping the Ethernet packet output to the corresponding port, on a priority basis until the port state information has a timer value of zero in response to the congestion control signal; and transmitting the memory state information on the corresponding port and information on the dropped packet.

* * * * *